United States Patent
Helmstetter

[11] Patent Number: 5,840,105
[45] Date of Patent: Nov. 24, 1998

[54] FIRE RESISTANT COATINGS FOR CELLULOSIC MATERIALS

[75] Inventor: Jack G. Helmstetter, Brick, N.J.

[73] Assignee: LOC Systems, Ltd., Lavallette, N.J.

[21] Appl. No.: 992,726

[22] Filed: Dec. 17, 1997

Related U.S. Application Data

[63] Continuation-in-part of Ser. No. 673,036, Jul. 1, 1996, abandoned.

[51] Int. Cl.$^6$ .............................. C09D 5/18; C09K 21/02
[52] U.S. Cl. ....................... 106/18.12; 252/607; 252/610
[58] Field of Search .................................. 252/606, 607, 252/608, 610, 611, 378 R; 106/18.12; 169/45

[56] References Cited

U.S. PATENT DOCUMENTS

| | | | |
|---|---|---|---|
| 3,615,781 | 10/1971 | Schneider et al. | 106/626 |
| 3,854,987 | 12/1974 | Micheal | 106/625 |
| 4,405,682 | 9/1983 | Fujita et al. | 428/317.7 |
| 4,424,867 | 1/1984 | Mallow | 169/43 |
| 4,435,215 | 3/1984 | Yoshino et al. | 106/623 |
| 4,748,066 | 5/1988 | Kelly et al. | 428/182 |
| 4,762,753 | 8/1988 | Perfetti | 428/450 |
| 4,851,044 | 7/1989 | Stawinski | 106/18.12 |
| 4,886,548 | 12/1989 | Helmstetter | 106/18.12 |
| 5,035,951 | 7/1991 | Dimanishteyn | 428/446 |
| 5,165,958 | 11/1992 | Plaisted et al. | 427/136 |

*Primary Examiner*—Joseph D. Anthony
*Attorney, Agent, or Firm*—Stephen W. White

[57] ABSTRACT

A novel and highly useful fire resistant solution for application to the surfaces of cellulosic and building materials is described. This solution is easy to prepare and apply and is made from environmentally safe elements. When applied to the surface of these materials and dried, the surface is highly resistant to fire. Buildings made which incorporate products thus coated will survive a fire much longer giving any occupants time to egress therefrom. Additionally, the surfaces of materials that contain this novel and proprietary coating solution will have excellent white color surfaces that can be washed over and over again without substantial loss in fire resistance.

4 Claims, No Drawings

FIRE RESISTANT COATINGS FOR CELLULOSIC MATERIALS

CROSS-REFERENCE TO RELATED APPLICATIONS

This invention is related to my previously filed application U.S. Ser. No. 08/673,036, filed Jul. 1, 1996 now abandoned and is a Continuation-in-Part thereof.

BACKGROUND OF THE INVENTION

1. Field of the Invention

This invention relates to the application of fire resistant coatings on cellulosic and other flammable substrates. Still more specifically, this invention relates to the application of fire resistant coatings on wall boards, ceiling tiles and other board-like elements that are essentially made from cellulosic materials. Even more specifically, this invention relates to the easy application of fire resistant coatings that can be applied easily and with great effect on the reduction of fire on cellulosic materials such as those used within buildings and the like, for example.

2. Description of the Prior Art

There are a number of prior art references which disclose element which can be used to surface treat materials that may include cellulosic materials in order to impart some degree of fire resistance thereto. These materials include, for example, aqueous salt solutions and the like. Although the surfaces of materials which are coated or treated with these prior art solutions are somewhat resistant to fire, they are not considered to be very fire resistant. In fact, none of these materials treated with aqueous salt solutions have received a Class A Fire resistant certificate by any known testing laboratory.

In my previous patent, U.S. Pat. No. 4,886,548, Dec. 12, 1989, I describe a coating solution made up from a particular mixture of three silicates that can be used to coat building materials and the like in order to impart fire resistant thereto. This solution is very useful indeed and has been well-received within the fire resistant industry. However, my solution requires that the user carefully control the solution as it is made up and stored. Also, the present of a plurality of silicate ingredients added thereto and additionally requires more expense and cost to make up since it needs these three, separate, silicate solutions in order to function properly. Also, my previous solutions were not particularly useful in the preparation of pure white surfaces, surfaces that can be washed many times without reducing the propensity to support combustion.

There have been other coatings and methods used to impart fire resistant to materials, some of which employ the use of silicates, for example. These include Dimanshtaeyn, U.S. Pat. No. 5,035,851, Jul. 30, 1991 which describes the use of a coating solution which includes a silicate, a clay and some inorganic materials (e.g. a borate) which can be used to coat metals, woods and foamed polymeric materials to impart some degree of fire resistant thereto. This is a complicated and expensive solution and complete resistance to fire is not always achieved.

Again, Luckanuck in U.S. Pat. No. 5,085,897, Feb. 4, 1992 describes a liquid mixture of silicate and an inert mineral fiber a mineral powder which is used to coat steel beams used within buildings. This solution, when coated on the steel building materials, is said to help reduce twisting of steel columns and other building materials in a fire, for example.

Nguyen et al., U.S. Pat. No. 4,888,057, Dec. 19, 1989 describes and claims a composite fire resistant coating which comprises a mixture of silicates and silicon carbide powder. It is said that building materials coated with these materials are resistant to fire. However, this coating too is complicated and expensive to use.

Other references which are part of the prior art also describe the use of silicate or silicate solutions, some with other ingredients contained therein, and these are purported to impart fire resistance when applied to or mixed with construction materials. None of these references (which are legion in number) teach the use of a simple, topical application of a particular solution of such a nature that when conventionally applied to cellulosic surfaces using conventional application techniques will not only impart significant fire resistance to the cellulosic material but can also be the vehicle for imparting a color fast and washable whiteness to the surface thereof.

There are no known, easily applied coating surfaces that can conveniently and cheaply coat cellulosic materials, especially those used within the building industry, and impart a high degree of fire resistance thereto. Therefor, it is imperative that such a coating be available within the building industry.

SUMMARY OF THE INVENTION

It is an object of this invention to provide a safe, convenient, environmentally safe and easy to use coating that can be applied to cellulosic materials in order to impart a high degree of fire resistant thereto. It is yet another object to provide such a coating that is stable, aqueous and thus can be applied within conventional equipment available within the prior art. It is also an object of this invention to provide a safe, stable fire resistant coating that is environmentally safe to use and dispose. Finally, it is an object of this invention to provide an improved coating on the surfaces of building materials, wherein this coating will not only impart a fire resistance but also have an improved whiteness in color and an improved, washable surface. These and yet other objects are achieved in a coating solution for imparting fire resistant to cellulosic materials, said solution comprising an aqueous solution of a sodium silicate with minor amounts of Bentonite and mica.

DETAILS OF THE INVENTION

There are a host of cellulosic materials that need to have some degree of fire resistance associated therewith. For example, there are a host of building materials which if rendered at least with some degree of fire resistance, will slow down the process of a fire contained therein thus providing essential safety to any occupants thereof. These building materials include dimensional lumber; wall boards of many types; surface materials that are placed within a building structure, for example; ceiling tiles, etc. etc. If these materials could be rendered at least partially fire resistant, any resulting fire would be of a slow burning nature and thus improve the safety of the occupants of the building. Although there are a number of prior art materials that have been reported as giving some fire resistance to building and cellulosic materials, none of these is very successful and thus my invention has answered a long standing need for giving substantial fire resistance to building and cellulosic materials.

By fire resistant, I mean that materials treated as taught within the ambit of this invention with the solutions described herein, these materials will then exhibit a substantial reduction in the propensity to support a fire.

In the preparation of the coating solution of this invention, I prefer to make up an aqueous solution which will contain the following (weight percent of the solution):

10 to 25% of sodium silicate
15 to 30% of total water
12 to 28% of pure white clay
15 to 35% of fine mica By the term "fine mica" I mean a mica that will pass through a 200 mesh screen, for example.

By sodium silicate, I prefer one that is made and manufactured by PQ Industries of Philadelphia, Pa. and sold as OW3. This material is an aqueous solution which is basically comprised of $SiO_2/Na_2O$, wherein the $Na_2O$ is about 9.1% by weight of the solution and the $SiO_2$ is about 29.5 weight %, with the remainder being water. This material has a specific gravity of about 42.2 baume, a weight of about 11.8 pounds/gallon, a pH of about 11.3 and viscosity of about 400 Centipoises.

By pure white clay, I mean an industrial clay that is made principally of a mineral smectite and is formed by the alteration of volcanic ash (e.g. Bentonite or Diatomite Clays). This material is commercially available and is sometimes used as drilling mud within the petroleum industry. Bentonite clay has the capability of swelling when wet and has a fine particle size. Small amounts of a conventional surfactant may also be added in order to insure complete mixing. I prefer adding a very small amount (e.g. less than 0.01% by weight of the surfactant Dowfax 2, Dow Chemical Co., Midland, Mich.)

In making up a solution of this material, I first mix up the water and clay for about 30 minutes which allows the clay to swell. The silicate, which may contain a small amount of the surfactant as mentioned above—and mica are then added under constant stirring and the solution is then ready for application on to the surface of a cellulosic building element. The solution should be stirred constantly during this step to permit any solids to remain in solution. I refer to this as "colloidic chemistry".

This material may be applied to the surfaces of cellulosic or building elements by any of the conventionally known techniques. This includes surface application by brush or other hand operation; curtain coating; pressure spraying; etc. The latter processes are needed to commercially apply this solution or slurry to conventionally prepared products such as ceiling tiles and the like. A drying cycle may then occur in order to cure the solution on the surface of the treated element and to insure a good surface. My coatings should be fluidly applied so as to form a coating depth of about ⅛ inch even over cellulosic surfaces that may include small fissures in the surface thereof (e.g. ceiling tiles and the like). These coatings must be stable and dry quickly and maintain a uniform depth of color throughout the thickness.

When this solution is applied to the surface of a cellulosic or building material, the propensity of this material to resist fire is greatly improved. For example, some pieces of medium density fiber board, which is essentially non resistant to fire, were treated with the aforementioned solution by applying the solution to the board at a coating weight of 15 to 25 grams per square foot of the board, these elements were essentially fire resistant. To test the efficacy of this coating, these boards were placed into a flame tunnel. Flame from a methane burner is introduced into the start of this tunnel with a prefixed air flow. The time of flame treatment is about 10 minutes. The amount of burning on each piece of board is measured along with the amount of smoke produced. When boards that were coated with my material were tested, the flame number was 25 which is a Class A rating. Smoke density was zero. This test is called the Steiner E-84 Test. Standard boards without treating essentially were consumed by the fire and considerable smoke was produced.

In yet another embodiment, cellulosic and building materials treated with the surface fire resistant treatment of this invention, can further be treated with a salt spray which helps maintain and increases the whiteness of the color. This surface is similar to a prime paint coat and the finish paint coat can be applied easily thereon. This step eliminates a latex paint coating, saves on paint costs and reduces environmentally hazards associated therewith. In addition, my coating is especially useful when applied to the surfaces of ceiling tiles used within a building, for example. Here, the color white is conventionally used most of the time and a pure white coating is especially advantageous for improving the lighting within the building such as within and office space. Since building code requirements are such that these tiles must be resistant to fire and also washable, whilst maintaining fire resistance, it is very important that any such coating applied have these important characteristics. My coating can be so applied and will have such characteristics, maintaining resistance to fire throughout at least 15 such washings. No prior art coating can claim such characteristics.

My fire resistant coating is environmentally safe, easy to apply and presents little or no hazard to humans when being applied on the surfaces of cellulosic or other building materials. My fire resistant coating is eminently useful when applied to dimensional lumber as well as all of the conventionally known building elements, such as wall boards, ceiling tiles, paneling, plywoods, particle boards and many, many other materials.

Finally, my coatings may be applied to certain roof underpanels that are usually installed over metal subdecking and under meltable, rolled rubber roofing, for example. Here, a flame is usually applied to melt the rubber roofing just enough to fuse the materials all together and thus provide a good, waterproof roof. However, the cellulosic materials used in this type of roofing are usually not resistant to fire and sometimes a fire will occur during the roofing process. These composite cellulosic materials are made from paper and other fibrous materials. When these materials are coated with my novel and proprietary solutions, made as described herein, they can safely be used without causing fires. No other prior art solution can lay claim to such properties.

In addition to the silicate, Bentonite, water and fine mica, small amounts of other materials may be added within the ambit of this invention. In particular, I have mentioned the addition of wetting agents and surfactants; bulking agents; thinners; colorants; and others as is well-known to those skilled in the art may also be added if desired and called for by the element being so treated. Although I have described the best mode envisioned within this application when filed, I do not intend to be limited by this disclosure in so far as the metes and bounds and specificity of my invention is concerned. However, I have a theory that states that the silicate is a heavy element within the system. Thus, when the solution or slurry or mixture of this invention is coated on the surface of a cellulosic element, the silicate naturally sinks to the bottom of the coating and thus causes the mica to rise to the surface. This final surface is extremely resistant to fire.

Finally, it should be mentioned again that the solution, slurry or mixture of this invention is extremely safe for the environment. All of the ingredients described within my specification are naturally occurring and safe to use. By safe, I mean not only safe for the user but safe for the environment itself. Hence, waste amounts of left over solution can be easily disposed without worry about pollution.

What is claimed is:

1. A fire resistant coating for application on the surface of cellulosic manufactured building materials, said coating comprising 1) 10 to 25% by weight of sodium silicate, 2) 15 to 30% by weight of water, 3) 12 to 28% by weight of pure white clay, and 4) 15 to 35% by weight of fine mica.

2. The fire resistant costing of claim 1 wherein said silicate is an aqueous mixture of $SiO_2$ and $Na_2O$ ) wherein said $Na_2O$ is about 9.1 percent by weight of the solution and said $SiO_2$ is about 29.5 percent by weight of the solution and said solution has a specific gravity of about 42.2 Baume, a pH of about 11.3 and a viscosity of about 400 Centipoises.

3. The fire resistant coating of claim 1 wherein said cellulosic building material is selected from the group consisting of ceiling tiles, roofing boards and wall boards.

4. The fire resistant coating of claim 1 wherein said coating is applied to said cellulosic building material at a thickness of at least $\frac{1}{8}^{th}$ inch.

* * * * *